United States Patent
Kim et al.

(10) Patent No.: US 7,269,147 B2
(45) Date of Patent: Sep. 11, 2007

(54) RELAYING BROADCAST PACKET IN A MOBILE AD-HOC NETWORK INCLUDING FLUSHING BUFFER IF BROADCAST COUNT NUMBER EXCEED BUFFER SIZE

(75) Inventors: Byoung-Chul Kim, Yongin-si (KR); Yong-Seok Park, Yongin-si (KR); Byung-Gu Choe, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 424 days.

(21) Appl. No.: 10/961,181

(22) Filed: Oct. 12, 2004

(65) Prior Publication Data

US 2005/0078678 A1   Apr. 14, 2005

(30) Foreign Application Priority Data

Oct. 13, 2003   (KR) .................. 10-2003-0071195

(51) Int. Cl.
H04H 1/00   (2006.01)
(52) U.S. Cl. ............... 370/312; 370/235; 370/412; 455/13.1; 455/11.1
(58) Field of Classification Search ............. 370/338, 370/390, 235, 412, 278, 229–236, 428, 429, 370/473, 312, 248, 351, 349, 356, 395.1, 370/395.3, 395.31, 395.53; 709/223, 224, 709/225, 226, 231, 232; 455/425, 424, 456.5, 455/456.6, 550.1, 575.1, 561, 445, 517, 11.1, 455/434, 452.1, 450, 453, 13.1; 375/138, 375/211
See application file for complete search history.

(56) References Cited

U.S. PATENT DOCUMENTS 4,667,287 A * 5/1987 Allen et al. ................ 709/234

5,086,428 A * 2/1992 Perlman et al. ............. 370/394

(Continued)

FOREIGN PATENT DOCUMENTS

JP   9-510562   10/1997

(Continued)

OTHER PUBLICATIONS

Chinese Office action for Chinese Patent Application No. 200410011983.5 issued on Dec. 29, 2006.

(Continued)

*Primary Examiner*—Edward F. Urban
*Assistant Examiner*—Charles Chow
(74) *Attorney, Agent, or Firm*—Robert E. Bushnell, Esq.

(57) ABSTRACT

Processing broadcast data in a mobile Ad-hoc network includes: determining if all of the broadcast packets have been received using a Latest Broadcast Count Number (NBC) stored in a neighbor table within a buffer of a pertinent node and Broadcast Count Number (BC) contained in the broadcast packets received from a transmitting node upon receipt of broadcast packets transmitted from the transmitting node. The Broadcast Count Number (BC) of the received broadcast packet is compared with a buffer size of the pertinent node if all of the broadcast packets transmitted from the transmitting node have been received. A hello packet for flushing a buffer of the transmitting node is generated and transmitted to the transmitting node, the buffer of the pertinent node is flushed, and the neighbor table of the flushed buffer is updated, if the Broadcast Count Number (BC) of the received broadcast packet exceeds the buffer size.

23 Claims, 12 Drawing Sheets

U.S. PATENT DOCUMENTS

| | | | |
|---|---|---|---|
| 5,175,765 A * | 12/1992 | Perlman | 380/30 |
| 5,416,777 A * | 5/1995 | Kirkham | 370/449 |
| 5,884,036 A * | 3/1999 | Haley | 709/224 |
| 5,987,011 A * | 11/1999 | Toh | 370/331 |
| 6,044,076 A * | 3/2000 | Yamamoto | 370/392 |
| 6,247,058 B1 * | 6/2001 | Miller et al. | 709/234 |
| 6,385,174 B1 * | 5/2002 | Li | 370/252 |
| 6,628,620 B1 * | 9/2003 | Cain | 370/248 |
| 6,791,949 B1 * | 9/2004 | Ryu et al. | 370/254 |
| 7,042,850 B2 * | 5/2006 | Stewart | 370/254 |
| 2001/0034788 A1 * | 10/2001 | McTernan et al. | 709/232 |
| 2002/0039357 A1 | 4/2002 | Lipasti et al. | |
| 2002/0145978 A1 | 10/2002 | Batsell et al. | |
| 2002/0176399 A1 | 11/2002 | Wilmer | |
| 2003/0076837 A1 | 4/2003 | Whitehill et al. | |
| 2003/0179742 A1 * | 9/2003 | Ogier et al. | 370/351 |
| 2003/0204587 A1 | 10/2003 | Billhartz | |
| 2003/0231598 A1 * | 12/2003 | Venkataraman et al. | 370/252 |
| 2003/0235175 A1 | 12/2003 | Naghian et al. | |
| 2004/0022224 A1 | 2/2004 | Billhartz | |
| 2004/0029553 A1 | 2/2004 | Cain | |
| 2004/0032625 A1 * | 2/2004 | Yamano | 358/405 |
| 2004/0156366 A1 * | 8/2004 | Walls et al. | 370/394 |
| 2004/0162819 A1 * | 8/2004 | Omae et al. | 707/3 |
| 2004/0171347 A1 * | 9/2004 | Burton et al. | 455/11.1 |
| 2004/0174844 A1 * | 9/2004 | Cho et al. | 370/328 |
| 2004/0213231 A1 * | 10/2004 | Cho et al. | 370/390 |
| 2005/0041627 A1 * | 2/2005 | Duggi | 370/338 |
| 2005/0058119 A1 * | 3/2005 | Inouchi et al. | 370/351 |
| 2005/0074007 A1 * | 4/2005 | Samuels et al. | 370/392 |

OTHER PUBLICATIONS

"*An Efficient Reliable Broadcast Protocol*" by Kaashoek, et al.
Japanese Office action for Japanese Patent Application No. JP 2004-297148 dated Jul. 25, 2006.
XP 000140304 Oct. 1989 US.
XP 010532478 Sep. 2000 US.
XP 000811708 Aug. 1987 US.
European Search Report for European Patent Application No. 04020607.0-2416 dated Jun. 12, 2006.

\* cited by examiner

FIG. 5

| Node ID | NBC | Buffer size | Missing packet list (bit - map) |
|---|---|---|---|
| 3 | 70 | 100 | |
| 5 | 32 | 100 | |
| 6 | 99 | 100 | |

RELAYING BROADCAST PACKET IN A MOBILE AD-HOC NETWORK INCLUDING FLUSHING BUFFER IF BROADCAST COUNT NUMBER EXCEED BUFFER SIZE

CLAIM OF PRIORITY

This application makes reference to, incorporates the same herein, and claims all benefits accruing under 35 U.S.C. § 119 from an application for "METHOD OF PROCESSING BROADCAST DATA IN A MOBILE AD-HOC NETWORK" earlier filed in the Korean Intellectual Property Office on 13 Oct. 2003 and there duly assigned Serial No. 2003-71195.

BACKGROUND OF THE INVENTION

1. Field of the Invention

The present invention relates to processing broadcast data in a Mobile Ad-hoc Network. More particularly, the present invention relates to processing broadcast data in a Mobile Ad-hoc Network which can increase bandwidth and improve reliability in transmission of broadcast data in a Mobile Ad-hoc Network (MANET) environment.

2. Description of the Related Art

In general, Transmission Control Protocol/Internet Protocol (TCT/IP) in the Internet consists of three major components, namely, a host (computer), physical networks connected to the host and a router for interconnecting the physical networks. Local Area Network (LAN) and Wide Area Network (WAN) data link technologies are used to support establishment of the physical networks.

TCP/IP in the Internet indicates a suite of protocols including rules for controlling data exchange in a Peer-to-Peer (P2) computer network, in which IP functions to provide connectionless best effort data delivery service.

Mobility Support IP or Mobile IP is a currently standardized form of IP-based mobile network, in which a mobile host executes communication through data transmission with a base station linked with a wired network at a one hop distance.

The mobile Ad-hoc network is envisioned to support a massive network such as the Internet or inter-node communication in an environment which has an economical disadvantage or a physical obstacle to constructing an infrastructure requiring a number of nodes. In the mobile Ad-hoc network, respective nodes can move freely without restriction. Since there is restriction in the consumption of resources and electric power, the mobile Ad-hoc network cannot use routing protocols such as those used in existing wired networks.

Current routing protocols can be generally divided into a reactive mode and a proactive mode. According to the reactive mode, each mobile node searches for the shortest paths via control messages only before the transmission of data, and then transmits the data through the searched shortest paths.

On the contrary, a mobile node using the proactive mode periodically transmits control packets to constantly search for paths and distances to other nodes, and thus can promptly launch data transmission through known shortest paths.

In the Ad-hoc network, nodes share a wireless media, and all of the nodes can transmit data at any time if necessary.

As a result, contention occurs for shared channels. Since resources are restricted in the wireless media as compared with a wire media, data loss through such contention and resultant collision is a serious problem that must be solved.

As an approach to overcome the above problem of collision resulting from contention, control messages of Request To Send (RTS) and Clear To Send (CTS) are used between a sender node and a receiver node in the Ad-hoc network.

This approach corresponds to unicast communication. However, the nodes use important control data for providing network information or routing path information via broadcast communication, which provides no effective solution to broadcast data loss caused by collision.

In order to avoid collision resulting from contention in the wireless media, various efforts have been made to process broadcast data by designating relayer nodes and via flooding.

SUMMARY OF THE INVENTION

An object of the present invention is to provide a method of processing broadcast data in a mobile Ad-hoc network which can increase bandwidth while raising reliability since bandwidth and reliability have a trade-off relation in the transmission of the broadcast data in the mobile Ad-hoc network.

According to an aspect of the present invention, a method is provided comprising: receiving broadcast packets transmitted from a transmitting node and determining if all of the broadcast packets have been received using a Latest Broadcast Count Number (NBC) stored in a neighbor table within a buffer of a pertinent node and a Broadcast Count Number (BC) contained in the broadcast packets received from the transmitting node; comparing the Broadcast Count Number (BC) of the received broadcast packet with a buffer size of the pertinent node if all of the broadcast packets transmitted from the transmitting node have been received; and generating a hello packet for flushing a buffer of the transmitting node and transmitting the hello packet to the transmitting node, flushing the buffer of the pertinent node, and updating the neighbor table of the flushed buffer of the pertinent node in accordance with the broadcast packet if the Broadcast Count Number (BC) of the received broadcast packet exceeds the buffer size of the pertinent node.

It is preferable that the neighbor table comprises ID information of a broadcast packet transmitting node, Latest Neighbor's Broadcast Count Number (NBC) information, buffer size information of a buffer storing the received broadcast packets and bit map information regarding a list of packets from among the received broadcast packets that have not been received due to a packet error or missing packet.

It is preferable that the transmitting node comprises a relay node to relay the broadcast packets transmitted via a sender node which generates and transmits the broadcast packets toward a receiving node.

It is preferable that each broadcast packet comprises an IP header field, a relayer node list information field including list information of neighboring relayer nodes, a broadcast count information field of broadcast packets transmitted from an associated node and a broadcast data field.

The method can further comprise updating received broadcast packet information in the neighbor table if the Broadcast Count Number (BC) of the received broadcast packet does not exceed the buffer size of the pertinent node.

The method can further comprise periodically generating a hello packet containing broadcast packet receipt confirmation information and transmitting the hello packet to the transmitting node according to a predetermined time period or a predetermined packet number upon receipt of the broadcast packet from the transmitting node.

It is preferable that the hello packet comprises a packet type information field, a reply information (NACK, ACK) field regarding receipt of the broadcast packet, a flag information field including a reserved field, an ID information field of a neighboring transmitting node, a Broadcast Count Number (BC) information field, a bit map information field (NACK MAP) of missing packets identified by a failure to receive a broadcast packet receipt, a neighbor information field containing ID information of the sender node and neighboring relayer nodes and NACK information as to reply information in response to the failure to receive the broadcast packet receipt, a broadcast retransmission information field containing ID information of a corresponding node from which a broadcast packet has not been received, and a node and ID information or source (SRC) address of the corresponding node.

The method can further comprise: determining if the Broadcast Count Number BC contained in the received broadcast packets is larger than a Broadcast Count Number (NBC+1) following the Latest Neighbor's Broadcast Count Number (NBC) if all of the broadcast packet have not been received; updating a missing packet list in the neighbor table of the receiver node and transmitting a hello packet for retransmission of a missing packet if the Broadcast Count Number transmitted up to the present from the transmitting node is larger than the Broadcast Count Number received up to the present; and determining if the receiver node has received all of the packets and a corresponding broadcast packet has been received at the request of another node for retransmission of a missing packet and discarding the received broadcast packet if the Broadcast Count Number transmitted up to the present from the transmitting node is not larger than the Broadcast Count Number received up to the present.

It is preferable that generating and transmitting a hello packet to the transmitting node comprises: sequentially retrieving broadcast data bit map information regarding respective nodes which transmitted the broadcast packets stored in the neighbor table to determine if there is a missing packet; and generating a hello packet for requesting the missing packet using a bit map in the neighbor table and transmitting the hello packet to a corresponding node which transmitted the missing packet if it has been determined that there is a missing packet.

It is preferable that, upon receiving the hello packet, the transmitting node: determines if the hello packet has been received from a new node which is not listed in a neighbor table within a buffer of the transmitting node; determines if the received hello packet is a triggering hello packet for flushing a full buffer if the hello packet has been received from a node listed in the neighbor table of the transmitting node; examines bit map information in the received hello packet to determine if there is a missing packet if the received hello packet is not the triggering hello packet but is a hello packet for periodically informing receipt of a broadcast packet; and transmits a broadcast packet corresponding to the missing packet to the node which transmitted the hello packet and updating the neighbor table of the transmitting node if there is a missing packet.

It is preferable that, if the received hello packet is determined to be a triggering hello packet, the transmitting node: determines if triggering hello packets have been received from all of the neighboring nodes for the purpose of buffer flushing; flushes the buffer if the triggering hello packets have been received from all of the neighboring nodes and sets a timer to count a set time if the triggering hello packets have not been received from all of the neighboring nodes; and compares the counted time with the set time and flushes the buffer even though the triggering hello packets have not been received from all of the neighboring nodes if the counted time exceeds the set time.

According to another aspect of the present invention, a method is provided comprising: providing at least one sender node and a relayer node to relay broadcast packets from the sender node to a receiver node; the receiver node determining if all of the broadcast packets transmitted from the sender or relayer node have been received based upon a Latest Neighbor's Broadcast Count Number (NBC) stored in a neighbor table within a buffer of the receiver node and a Broadcast Count Number (BC) contained in the broadcast packets received from the sender or relayer node upon receiving the broadcast packets from the sender or relayer node; the receiver node comparing the received broadcast packets with the buffer size of the Broadcast Count Number (BC) if all of the broadcast packets from the sender or relayer node have been received; and generating a hello packet for flushing a buffer in the sender or relayer node and transmitting the hello packet to any of the sender and relayer nodes which transmitted the broadcast packets, flushing the buffer of the receiver node, and updating the neighbor table of the flushed neighbor table of the receiver node using the received broadcast packets if the Broadcast Count Number (BC) of the received broadcast packets exceeds the buffer size of the receiver node.

It is preferable that the neighbor table within the buffer of the receiver node comprises ID information of the relayer node which relayed the broadcast packets, latest NBC information received from the node which transmitted the broadcast packets, buffer size information of the buffer storing the received broadcast packets and bit map information regarding a list of packets from among the received broadcast packets which have not been received due to a packet error or missing packet.

It is preferable that each of the broadcast packets comprises an IP header field, a relayer node list information field containing list information of neighboring relayer nodes of the receiver node, a broadcast count information field for the broadcast packets transmitted from a corresponding node, and a broadcast data field.

The method can further comprise the receiver node periodically generating and transmitting a hello packet containing broadcast packet receipt confirmation information to the relayer node or to the sender node via the relayer node according to a predetermined time interval or a predetermined packet number upon receiving the broadcast packet from the relayer node.

It is preferable that the hello packet transmitted to the relayer node or to the sender node via the relayer node from the receiver node comprises: a packet type information field, a reply information (NACK, ACK) field regarding receipt of the broadcast packet, a flag information field including a reserved field, an ID information field of a neighboring transmitting node, a broadcast count (BC) information field, a bit map information field (NACK MAP) of missing packets identified by a failure to receive a broadcast packet receipt, a neighbor information field containing ID information of the sender node and neighboring relayer nodes and NACK information as reply information in response to the failure to receive the broadcast packet receipt and a broadcast retransmission information field containing ID information of a corresponding one of the relayer and sender nodes from which a broadcast packet has not been received and a node and ID information or source (SRC) address of the corresponding node.

The method can further comprise: determining if the Broadcast Count Number (BC) contained in the received broadcast packet is larger than a Broadcast Count Number NBC+1 following the Latest Neighbor's Broadcast Count Number (NBC) if it has been determined that all of the transmitted broadcast packets have not been received from the relayer node; updating a missing packet list in the neighbor table of the receiver node and transmitting a hello packet for retransmission of a missing packet if the Broadcast Count Number transmitted up to the present from the relayer node is larger than the Broadcast Count Number received up to the present; and determining if the receiver node has received all of the packets and a corresponding broadcast packet has been received at the request of another node for retransmission of a missing packet and discarding the received broadcast packet if the Broadcast Count Number transmitted up to the present from the relayer node is not larger than the Broadcast Count Number received up to the present. It is preferable that generating and transmitting a hello packet to the relayer node or to the sender node via the relayer node comprises: sequentially retrieving broadcast data bit map information regarding the sender and relayer nodes which have transmitted broadcast packets stored in the neighbor table within the buffer of the receiver node to determine if there is a missing packet; and generating a hello packet for requesting the missing packet using bit map information in the neighbor table and transmitting the hello packet to the relayer node or to the sender node via the relayer node that transmitted the missing broadcast packet if it has been determined that there is a missing packet.

It is preferable that upon receiving the hello packet, the relayer or sender node: determines if the hello packet has been received from a new receiver node which is not listed in a neighbor table within a buffer of the relayer or sender node; determines if the received hello packet is a triggering hello packet for flushing a full buffer if the hello packet has been received from a node listed in the neighbor table of the relayer or sender node; examines bit map information in the received hello packet to determine if there is a missing packet if the received hello packet is not the triggering hello packet but is a hello packet for periodically informing receipt of broadcast packets; and transmits a broadcast packet corresponding to the missing packet to the receiver node which transmitted the hello packet and updates the neighbor table of the relayer or sender node if there is a missing packet.

It is preferable that, if the received hello packet is determined to be a triggering hello packet, the relayer or sender node: determines if the triggering hello packets have been received from all of the neighboring nodes for flushing the buffer; flushes the buffer if the triggering hello packets have been received from all of the neighboring nodes, and sets a timer to count a set time if the triggering hello packets have not been received from all of the neighboring nodes; and compares the counted time with the set time and flushes the buffer even though the triggering hello packets have not been received from all of the neighboring nodes if the counted time exceeds the set time.

According to yet another aspect of the present invention, a method is provided comprising: providing at least one sender node and a relayer node to relay broadcast packets from the sender node to a receiver node; transmitting a hello packet processed by the relayer or sender node upon receipt of the broadcast packets: determining if the hello packet has been received from a new receiver node which is not listed in a neighbor table within a buffer of the relayer or sender node; determining if the received hello packet is a triggering hello packet for flushing a full buffer if the hello packet has been received from a node listed in the neighbor table of the relayer or sender node; examining bit map information in the received hello packet to determine if there is a missing packet if the received hello packet is not the triggering hello packet but is a hello packet for periodically acknowledging receipt of the broadcast packets; and transmitting a broadcast packet corresponding to the missing packet to the receiver node which transmitted the hello packet and updating the neighbor table of the relayer or sender node if there is a missing packet.

It is preferable that if the received hello packet is determined to be a triggering hello packet, the relayer or sender node: determines if the triggering hello packets have been received from all of neighboring nodes for flushing the buffer; flushes the buffer if the triggering hello packets have been received from all of the neighboring nodes and sets a timer to count a set time if the triggering hello packets have not been received from all of the neighboring nodes; and compares the counted time with the set time and flushes the buffer even though the triggering hello packets have not been received from all of the neighboring nodes if the counted time exceeds the set time.

It is preferable that the hello packet transmitted from the receiver node comprises: a packet type information field, a reply information (NACK, ACK) field regarding receipt of the broadcast packet, a flag information field including a reserved field, an ID information field of a neighboring transmitting node, a broadcast count (BC) information field, a bit map information field (NACK MAP) of missing packets in response to a failure to receive a broadcast packet receipt, a neighbor information field containing ID information of the sender node and neighboring relayer nodes and NACK information as reply information in response to the failure to receive the broadcast packet receipt and a broadcast retransmission information field containing ID information of a corresponding one of the relayer and sender nodes from which a broadcast packet has not been received and a node and ID information or source (SRC) address of the corresponding node.

The following patents each discloses features in common with the present invention but do not teach or suggest the inventive features specifically recited in the present application: U.S. Patent Application No. 2003/0235175 to Naghian et al., entitled MOBILE MESH AD-HOC NETWORKING, issued on Dec. 25, 2003; U.S. Patent Application No. 2003/0204587 to Billhartz, entitled TRACKING TRAFFIC IN A MOBILE AD HOC NETWORK, issued on Oct. 30, 2003; U.S. Patent Application No. 2003/0076837 to Whitehill et al., entitled SYSTEM AND METHOD FOR PROVIDING A CONGESTION OPTIMIZED ADDRESS RESOLUTION PROTOCOL FOR WIRELESS AD-HOC NETWORKS, issued on Apr. 24, 2003; U.S. Patent Application No. 2002/0176399 to Wilmer, entitled MULTICAST WIRELESS AD HOC PACKET ROUTING, issued on Nov. 28, 2002; U.S. Patent Application No. 2002/0145978 to Batsell et al., entitled MRP-BASED HYBRID ROUTING FOR MOBILE AD HOC NETWORKS, issued on Oct. 10, 2002; U.S. Patent Application No. 2002/0039357 to Lipasti et al., entitled ADDRESSING AND ROUTING IN MOBILE AD HOC NETWORKS, issued on Apr. 4, 2002; U.S. Patent Application No. 2004/0029553 to Cain, entitled MULTIPLE PATH REACTIVE ROUTING IN A MOBILE AD HOC NETWORK, issued on Feb. 12, 2004; U.S. Patent Application No. 2004/0022224 to Billhartz, entitled MULTI-CHANNEL MOBILE AD HOC NETWORK, published on Feb. 5, 2004; and U.S. Pat. No. 6,628,620 to Cain, entitled HIERARCHICAL MOBILE AD-HOC NETWORK AND METHODS FOR ROUTE ERROR RECOVERY THEREIN, issued on Sep. 30, 2003.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 5 is a Huffman table or neighbor table stored and maintained in a database of a receiver node for receiving broadcast packets in a method of processing broadcast data in a mobile Ad-hoc network in accordance with an embodiment of the present invention;

DETAILED DESCRIPTION

Hereinafter, a method of transmitting data in the Ad-hoc network will be described in brief with reference to FIGS. 1 to 4.

Figure 1:
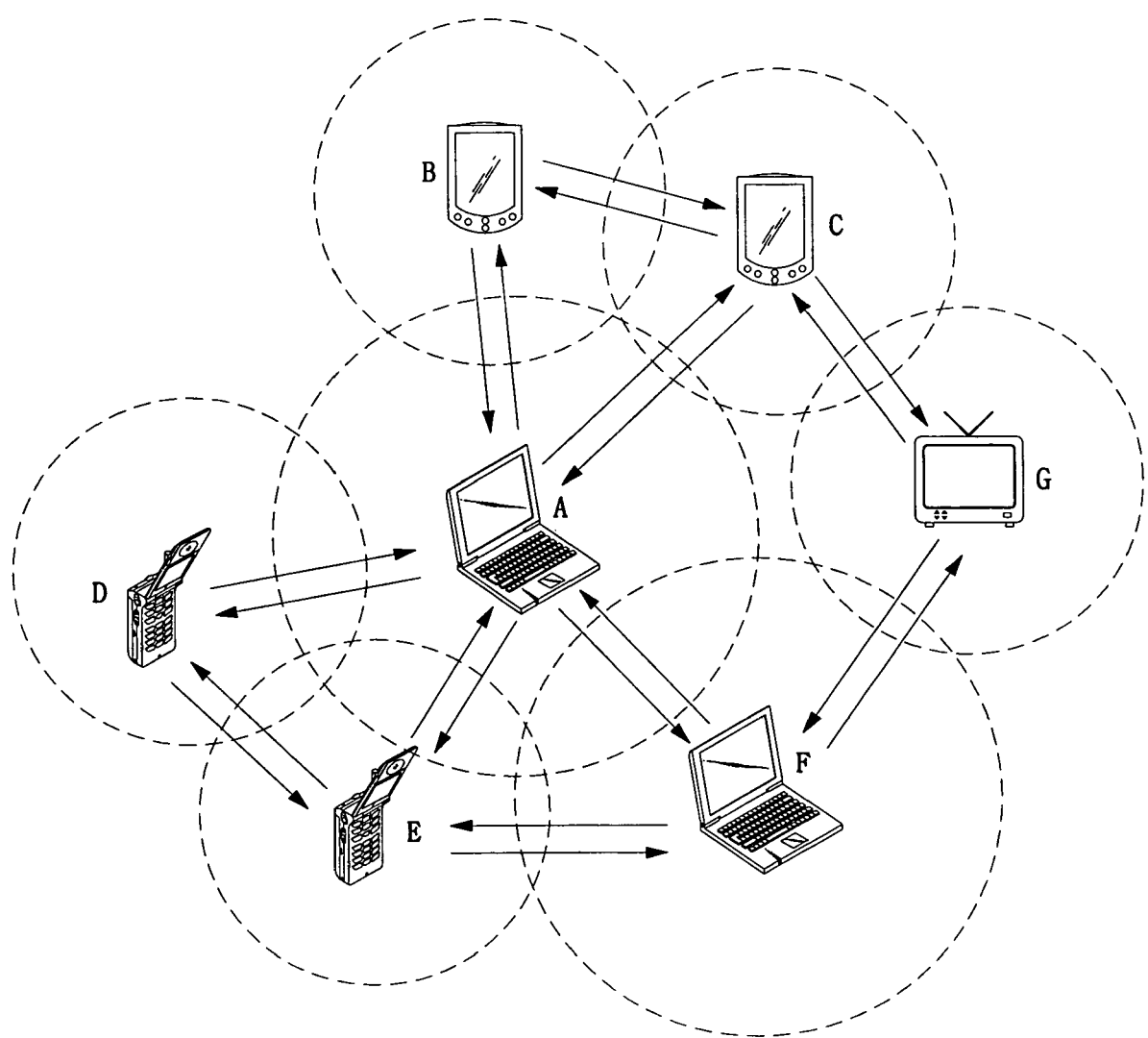
FIG. 1 is conceptual view of a process of transmitting a data via flooding in an Ad-hoc network.
Figure 2:
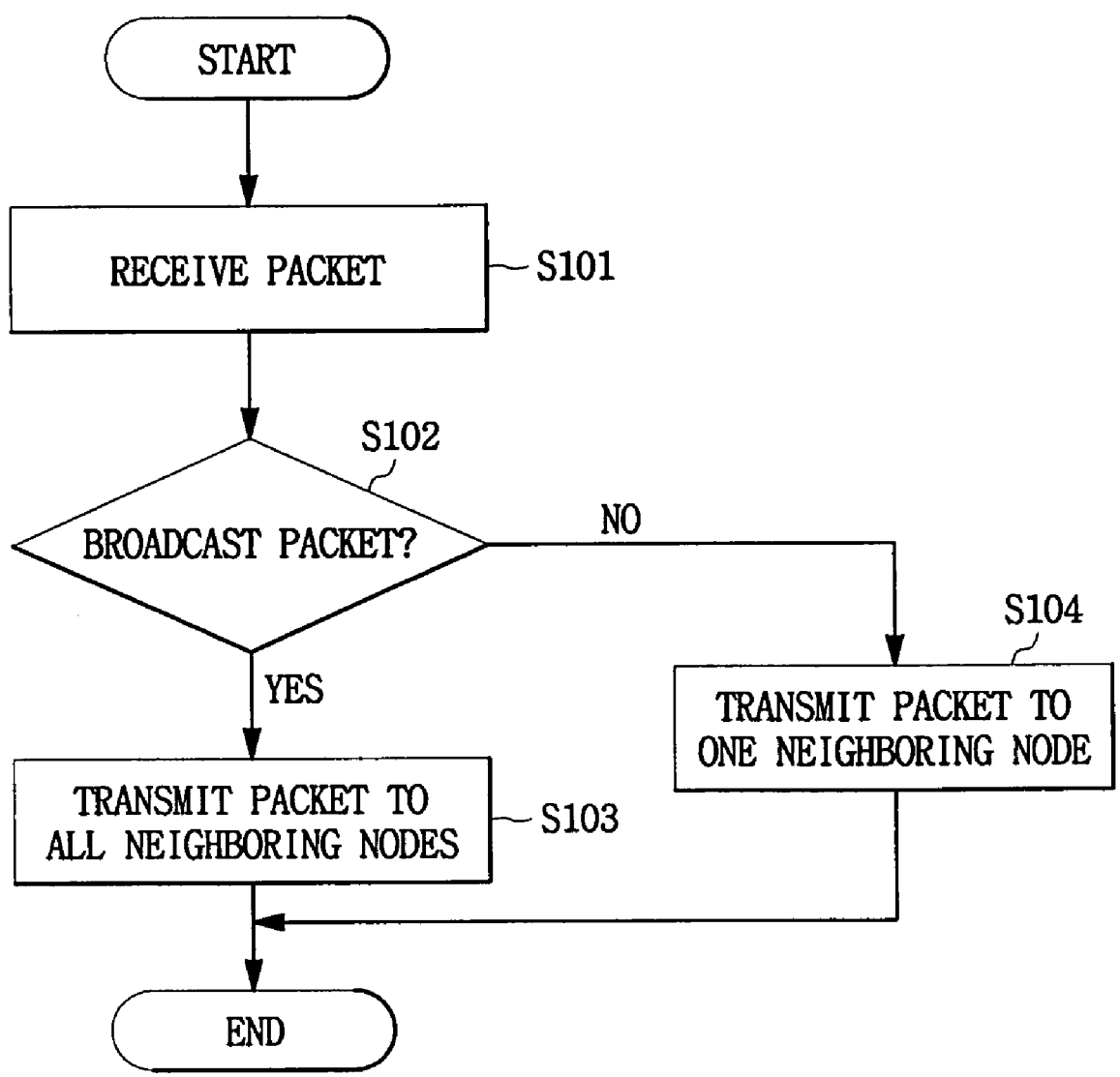
FIG. 2 is a flowchart of a process of transmitting a broadcast packet via flooding as shown in FIG. 1.

FIG. 1 is a conceptual view of a process of transmitting a data via flooding in an Ad-hoc network, and FIG. 2 is a flowchart of a process of transmitting a broadcast packet via flooding as shown in FIG. 1.

In an Ad-hoc network of FIG. 1 comprising a number of nodes A to G, when the node B transmits broadcast data, all the other nodes A and C to G transmit the data to respective neighboring nodes via flooding as explained with reference to FIG. 1.

A method of transmitting packets via flooding will be described briefly with reference to the flowchart of FIG. 2.

First, when a node receives a packet (S101), the node determines whether the received packet is a broadcast packet (S102).

If the received packet is a broadcast packet, the node transmits the received broadcast packet to all neighboring nodes (S103). On the other hand, if the received packet is a unicast packet, the node transmits the packet to one neighboring node (S104).

The above packet transmission method via flooding has an advantage to potentially raise the reliability of data transmission since the probability of receiving/transmitting same data is high even though collision occurs through flooding of broadcast data. However, this method also has a problem in that a large number of collisions occur and bandwidth is wasted since the same data is redundantly received/transmitted via flooding.

Next, a method of transmitting a data by designating a relayer will be described with reference to FIGS. 3 and 4.

Figure 3:
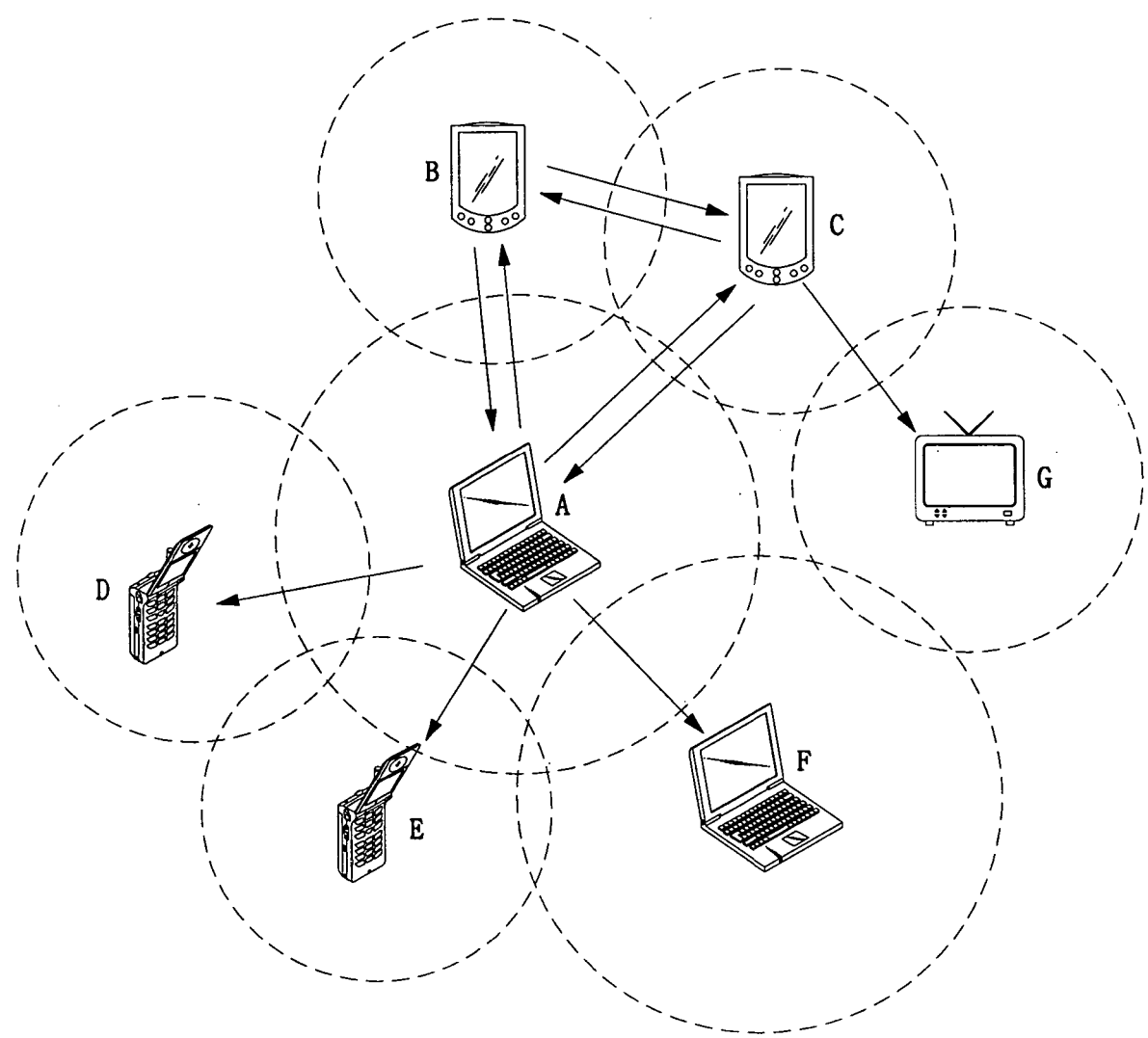
FIG. 3 is a conceptual view of an Ad-hoc network executing data transmission by selecting a relayer node.
Figure 4:
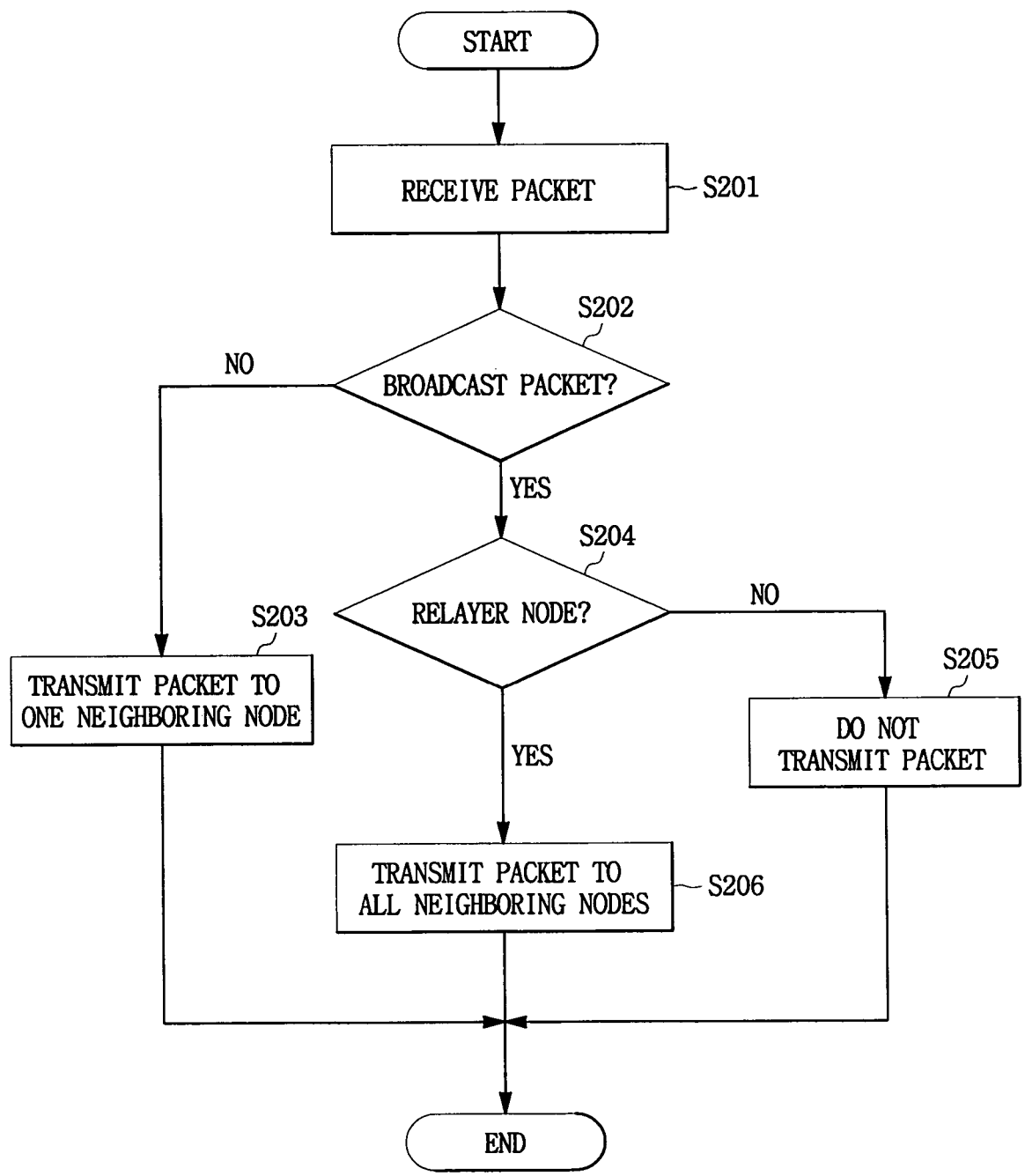
FIG. 4 is a flowchart of a process of transmitting a broadcast packet by designating a relayer node.

FIG. 3 is a conceptual view of an Ad-hoc network executing data transmission by selecting a relayer node, and FIG. 4 is a flowchart of a process of transmitting a broadcast packet by designating a relayer node.

As shown in FIG. 3, when a node B transmits broadcast data, only nodes A and C are designated as relayer nodes so that only the designated relayer nodes A and C can relay the broadcast data to other nodes.

According to this technique, other nodes, except for the relayer nodes, serve as receiver nodes.

The data transmission process via designation of the relayer nodes will be described with reference to FIG. 4.

First, when a node receives a packet (S201), the node determines whether the received packet is a broadcast packet (S202).

If the received packet is a unicast packet rather than a broadcast packet, the node transmits the received unicast packet to one neighboring node (S203). If the received packet is a broadcast packet, the node determines whether or not the node itself is a relayer node (S204).

If the node is not the relayer node, the node does not transmit the received packet to any other nodes (S205). On the contrary, if the node is the relayer node, the node transmits the received broadcast node to all other neighboring nodes (S206).

There is an advantage that this method can reduce redundant receipt/transmission of data to reduce wasted bandwidth unlike the flooding. However, this method has a poor data transmission reliability, and it is difficult to designate a relayer in the Ad-hoc network which has a constantly changing network topology.

As set forth above, the flooding heavily wastes bandwidth to reliably transmit broadcast data in an MANET environment, and the method of designating a relayer node has a poor reliability even though it can reduce bandwidth waste.

Hereinafter, a method of processing broadcast data in a mobile Ad-hoc network in accordance with an embodiment of the present invention will be discussed in detail with reference to the appended drawings.

The method of processing broadcast data in a mobile Ad-hoc network in accordance with an embodiment of the present invention utilizes the relaying technique as shown in FIGS. 3 and 4 to designate relayer nodes for transmitting the broadcast data in the MANET environment.

First, each relayer node transmits relayed broadcast data while increasing the count number thereof by using an IP option header field.

Further, the relayer node maintains the relayed broadcast data together with the count number of the relayed broadcast data.

In response to a hello broadcast packet from a node designated as a receiver node to which the relayer node periodically transmits the broadcast data, the relayer node provides Broadcast Count Number information of the broadcast data which have been transmitted so far to the receiver node.

The receiver node manages all of the received Broadcast Count Numbers of relayer nodes in a database thereof in the form of a Huffman table as shown in FIG. 5.

That is, as shown in FIG. 5, the Huffman table or neighbor table managed by the receiver node manages IDs of relayer nodes which have relayed the broadcast data, the Latest Neighbor's Broadcast Count Number (NBC) of the broadcast data received from the relayer nodes up to the present, buffer size for storing the received broadcast data and missing packet list information or bit map information of some of the broadcast data which are not received owing to errors or missing packets.

The receiver node compares the Broadcast Count Number (BC) of a hello packet received from a relayer node with the Latest Neighbor's Broadcast Count Number (NBC) of the relayer node stored in the database, and provides this information on a hello response packet to the relayer node based upon Selective Acknowledgement (SACK) with respect to a missing packet in order to request retransmission of the missing packet. As a result, application of SACK can prevent wasted bandwidth by reducing the quantity of retransmission request packets.

Upon receiving a Broadcast Count Number (BC) exceeding the size of a buffer for broadcast packet retransmission in the relayer node, the receiver node transmits a triggering hello reply packet to null the Broadcast Count Number (BC) while flushing the broadcast packet retransmission buffer of the relayer node.

This mechanism reduces the size of the hello reply packet and overhead, in which the Broadcast Count Number (BC) increases indefinitely, as well as enables effective management of the broadcast buffer of the relayer node.

This operation will be described in more detail with reference to the appended drawings.

Figure 6:
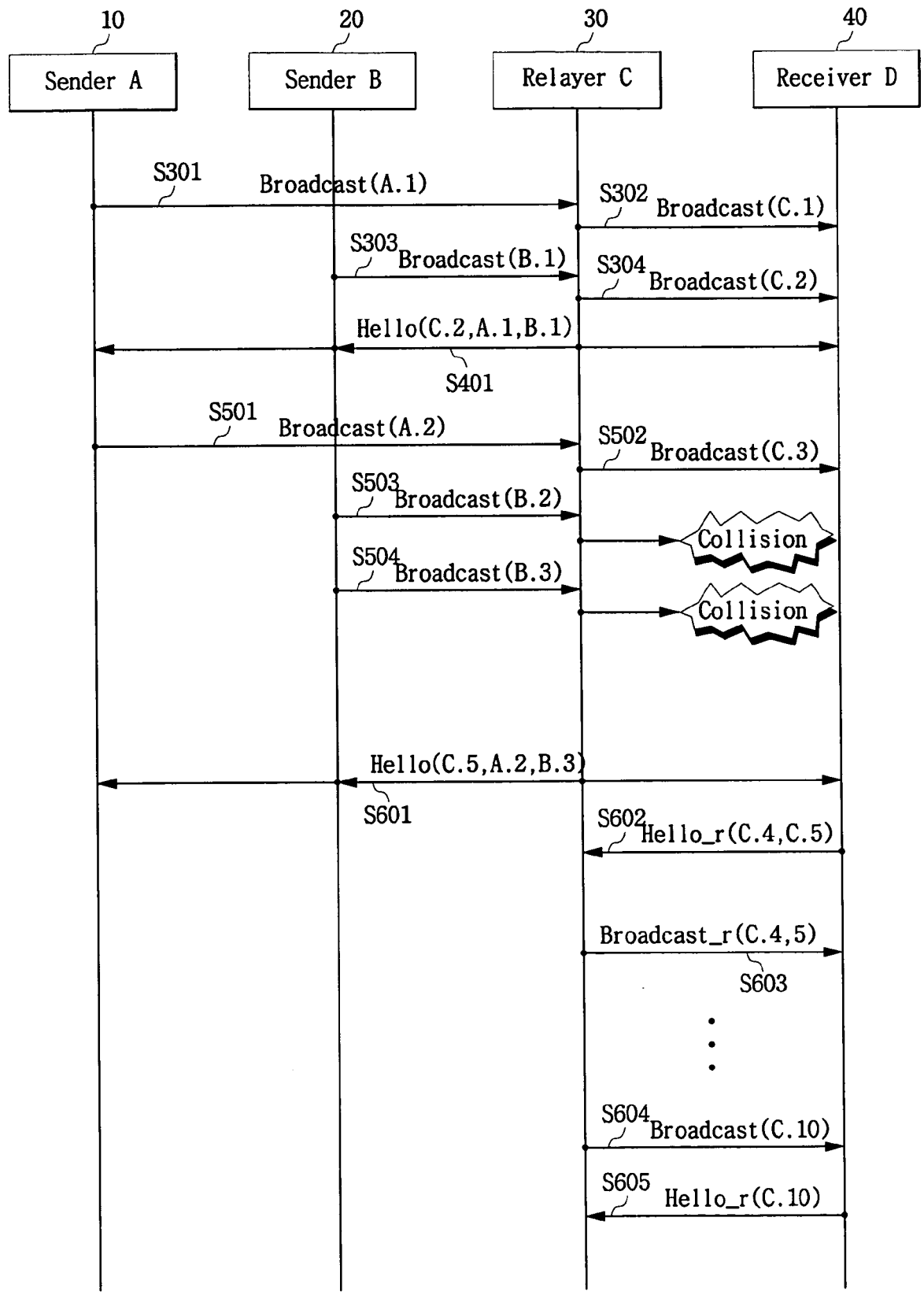
FIG. 6 is a sequence of a protocol operation executed in the method of processing broadcast data in an Ad-hoc network in accordance with an embodiment of the present invention.

FIG. 6 illustrates a sequence of a protocol operation executed in the method of processing broadcast data in an Ad-hoc network in accordance with an embodiment of the present invention.

As shown in FIG. 6, nodes 10 and 20 are assumed to be senders A and B for generating broadcast packets, a node 30 is assumed to be a relayer C for relaying the broadcast packets received from the senders A and B to a node 40.

The node 40 is assumed to be a receiver D for receiving the broadcast packet relayed via the relayer C.

The sender A generates one broadcast packet Broadcast (A.1) and transmits the broadcast packet Broadcast (A.1 to the relayer C (S301) and the sender B generates one broadcast packet Broadcast (B.1) and transmits the broadcast packet Broadcast (B.1) to the relayer C (S303). Then, the relayer C relays the broadcast packet Broadcast (A.1) from the sender A to the receiver D by recording information Broadcast (C.1) about count numbers on the broadcast packet Broadcast (A.1) (S302). The relayer C relays the broadcast packet Broadcast (B.1) from the sender B to the receiver D by recording count number information Broadcast (C.2) in the broadcast packet Broadcast (B.1) (S304).

The relayer C periodically transmits hello packets Hello (C.2, A.1, B.1) to the nodes 10, 20 and 40 or the senders A and B and the receiver D while relaying the broadcast packets. The hello packets are periodically transmitted from respective nodes in the MANET environment as in step S401 in FIG. 6. The relayer C transmits the hello packets Hello (C.2, A.1, B.1), which contains count number information of the packets broadcasted by the relayer C and current Broadcast Count Number information transmitted from neighboring one-hop nodes, to the respective nodes 10, 20 and 40, that is, the senders A and B and the receiver D. That is, in step S401, the relayer C transmits information Hello (C.2) containing its node information and count number information of the broadcast packet relayed by the relayer C, sender node information of broadcast information and count number information Hello (A.1, B.1) of the broadcasting packets from the senders A and B toward the respective nodes 10, 20 and 40, periodically according to a predetermined time interval or a predetermined packet number.

When a broadcast packet from the sender A is transmitted together with Broadcast Count Number information Broadcast (A.2) toward the relayer C (S501), the relayer C relays the broadcast packet containing Broadcast Count Number information from the sender A to the receiver D (S502).

However, if the broadcast packets transmitted from the sender B are missing through collision during transmission toward the receiver D by the relayer C as can be seen in S503 and S504 in FIG. 6, the relayer C periodically transmits hello packets Hello (C.5, A.2, B.3), which contain Broadcast Count Number information which is periodically relayed by itself and Broadcast Count Number information received from the respective senders A and B, toward the respective nodes 10, 20 and 40 (S601).

Upon receiving the hello packet, the receiver D retrieves a Huffman table (neighbor table) stored in its database as shown in FIG. 5 to find any broadcast packet which has not been received. Then, the receiver D transmits a hello reply packet, e.g., Hello_r (C.4, C.5) to the relayer C to request the unreceived broadcast packet (S602). That is, based upon information that 5 is the count number of the broadcast packets relayed by the relayer C with respect to the hello packets transmitted from the relayer C, the receiver D transmits the hello reply packet Hello_r (C.4, C.5) to request retransmission of broadcast packets about Nos. 4 and 5 which are not received, as can be seen in S602 in FIG. 6.

As a result, upon receiving the hello replay packet Hello_r (C.4, C.5), the relayer C retransmits the requested broadcast packets about Nos. 4 and 5 to the receiver D. Then, the receiver D or the node 40 receives the broadcast packets about Nos. 4 and 5, and then updates corresponding broadcast packets in the table shown in FIG. 5 so that the updated broadcast packets can be stored and managed therein.

As final steps S603 and S604 in FIG. 6, when the receiver D or the node 40 receives a Broadcast Count Number 10, if the size of a broadcast packet retransmission buffer of the relayer C or the node 30 is assumed to be 10, the receiver D triggers a hello reply packet. Upon successful receipt of a triggering hello packet from a one-hop node, the relayer C flushes the broadcast packet retransmission buffer.

Hereinafter, data formats of the broadcast packets transmitted from the senders A and B or the relayer C and the hello reply packets transmitted from the relayer C will be described with reference to FIGS. 7 and 8.

Figure 7:
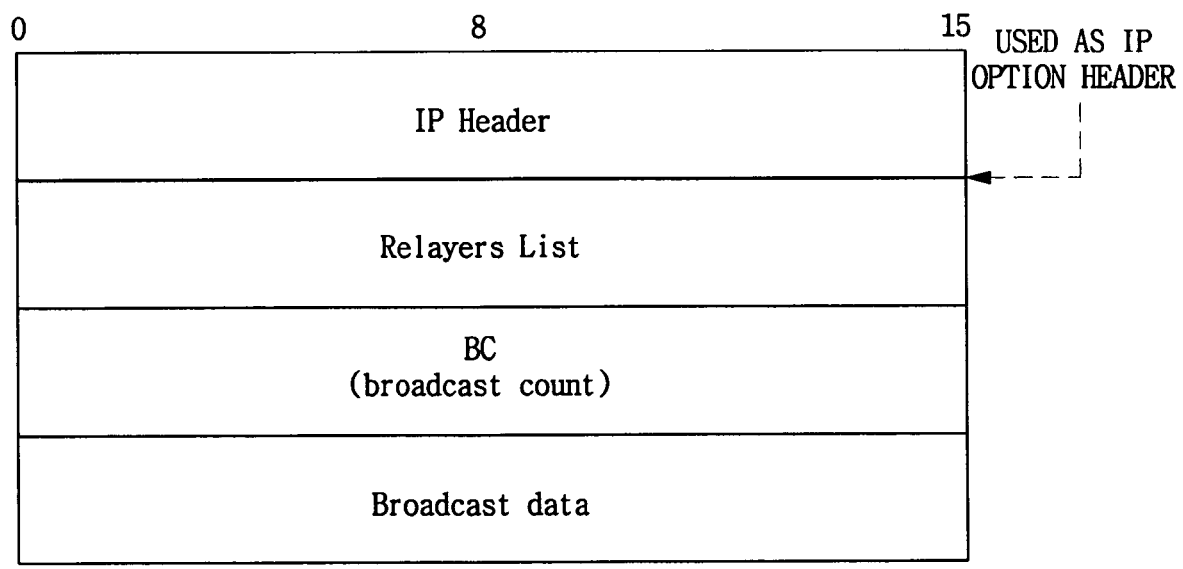
FIG. 7 is a data format of a broadcast packet in accordance with an embodiment of the present invention.
Figure 8:
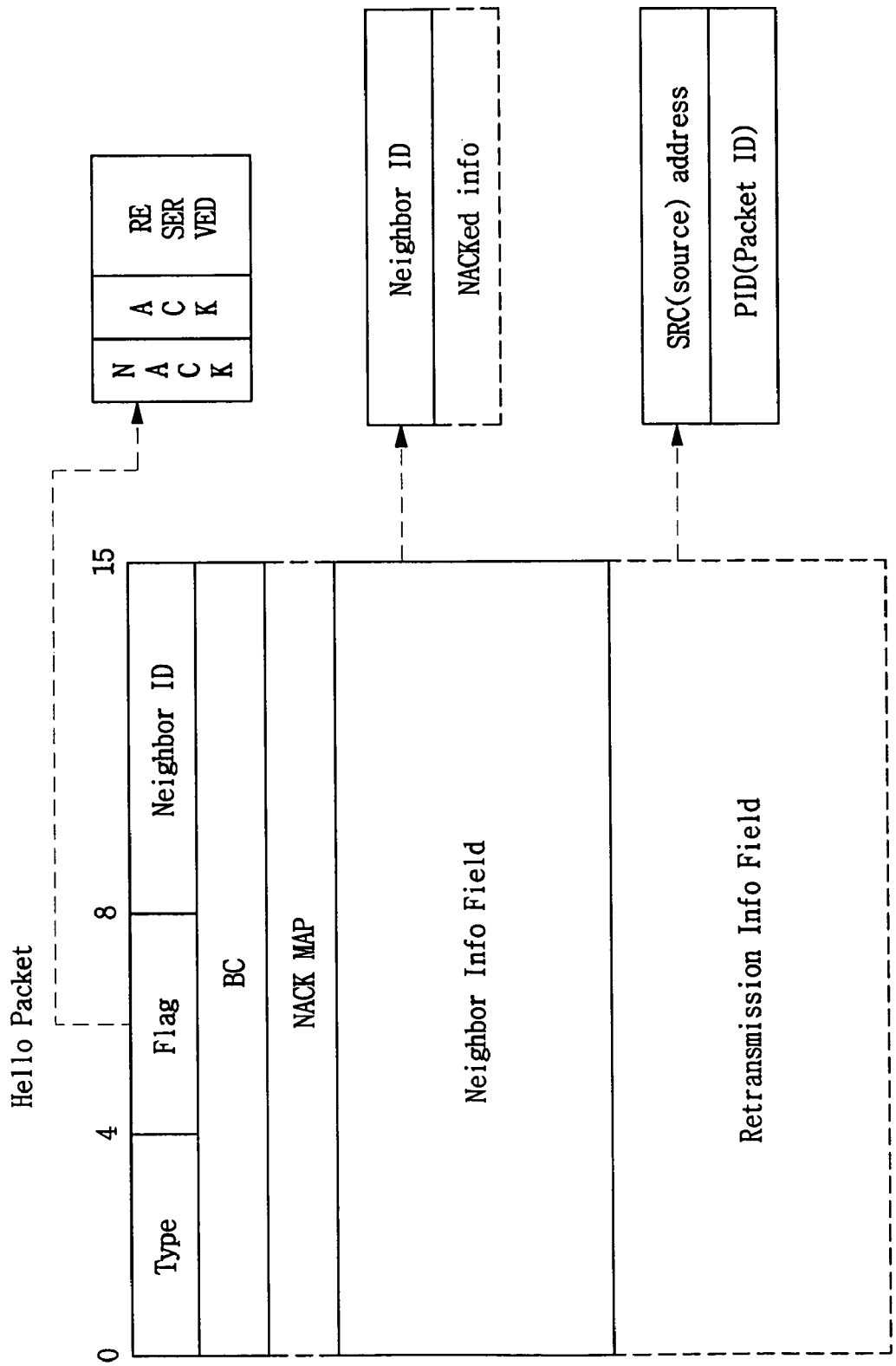
FIG. 8 is a data format of a hello packet in accordance with an embodiment of the present invention.

FIG. 7 is a data format of a broadcast packet in accordance with an embodiment of the present invention, and FIG. 8 illustrates a data format of a hello packet in accordance with the an embodiment of the present invention.

First, referring to FIG. 7, the broadcast packet format can be generally divided into an IP header field, an IP option header field and a broadcast data field. The IP option header field can include a relayer list information field containing list information about an neighboring relayer node of an associated node for receiving a broadcast data and a broadcast count information field about a broadcast packet received by the associated node.

Describing a hello packet format transmitted from a relayer node or a receiver node, as shown in FIG. 8, a hello packet includes a type information field, a flag information field and an ID information field regarding a neighboring node or a sender node. The flag information field can be divided into a reply information (NACK, ACK) field regarding receipt of the broadcast packet and a reserved field.

The hello packet also includes a broadcast count information field BC, a bit map information field NACK MAP of a missing packet in the case of failing to receive the broadcast packet, a neighbor information field of neighboring nodes and a broadcast retransmission information field. The neighbor information field contains neighbor ID information of the sender and other neighboring nodes and NACK information as reply information in the case of failing to receive the broadcast packet.

The retransmission information field contains ID information PID (Packet ID) of broadcast packets which have not been received from specific nodes and ID information, that is, SRC (source) address regarding the specific nodes.

Hereinafter, a process of generating a hello packet in the relayer node or the receiver node and transmitting the hello packet to the sender node or the relayer node will be described in a stepwise fashion with reference to FIG. 9.

Figure 9:
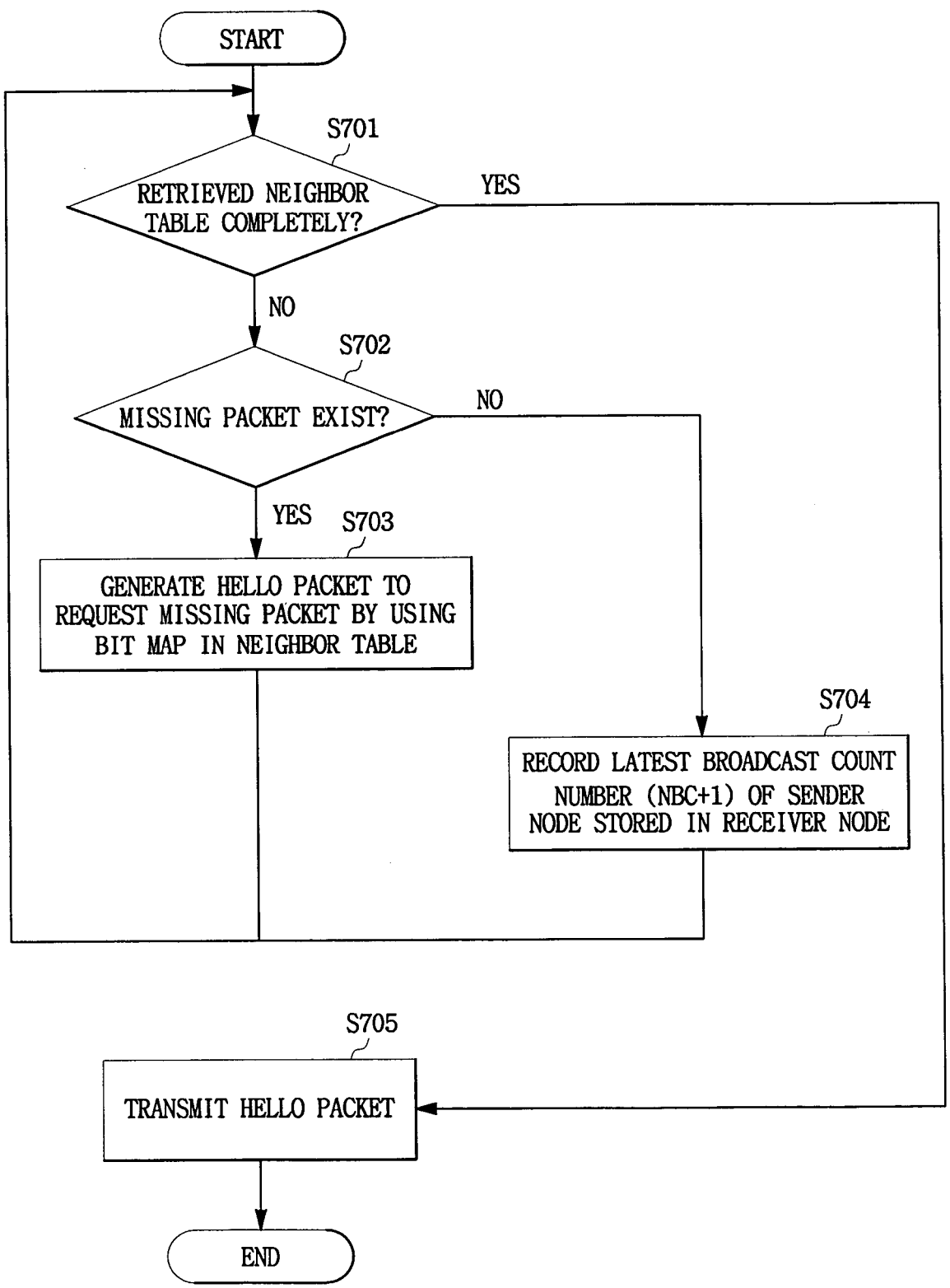
FIG. 9 is a flowchart of a process of generating a hello packet and transmitting the hello packet in accordance with an embodiment of the present invention.

FIG. 9 is a flowchart of a process of generating a hello packet and transmitting the hello packet in accordance with an embodiment of the present invention.

As shown in FIG. 9, any one of the relayer and receiver nodes retrieves the neighbor table shown in FIG. 5 in sequence in order to generate a hello packet. The pertinent node determines whether the neighbor table has been completely retrieved (S701).

If it is determined that the table has not been completely retrieved, then the pertinent node retrieves bit map fields of respective nodes in the neighbor table shown in FIG. 5 to determine if there is a missing broadcast packet (S702).

If it is found that a packet is missing in broadcast packets transmitted from any neighboring node, then the pertinent node refers to the bit map of the corresponding node of the neighbor table to generate the hello packet for requesting retransmission of the missing packet (S703).

However, if a packet is not missing in the broadcast packets transmitted from any neighboring node, then the pertinent node generates a hello packet containing the Latest Neighbor's Broadcast Count Number (NBC+1) of a sender node stored in a receiver node (S704). The number NBC+1 indicates the next Broadcast Count Number to be transmitted from the sender. For example, if the sender transmitted 30 broadcast packets and the relayer node or the receiver node successfully received all of the packets, the pertinent node generates the hello packet containing count number information indicating NBC(30)+1=31 to transmit this information to the sender.

After the pertinent node generates the hello packet based upon the retrieval result regarding receipt of the broadcast packets from all the neighboring nodes stored in its neighbor table, the pertinent node transmits the generated hello packet to the sender node (S705).

Next, a process of receiving the hello packet generated in the relayer node or the sender node according to the process in FIG. 9 will be described in a stepwise fashion with reference with FIG. 10.

Figure 10:
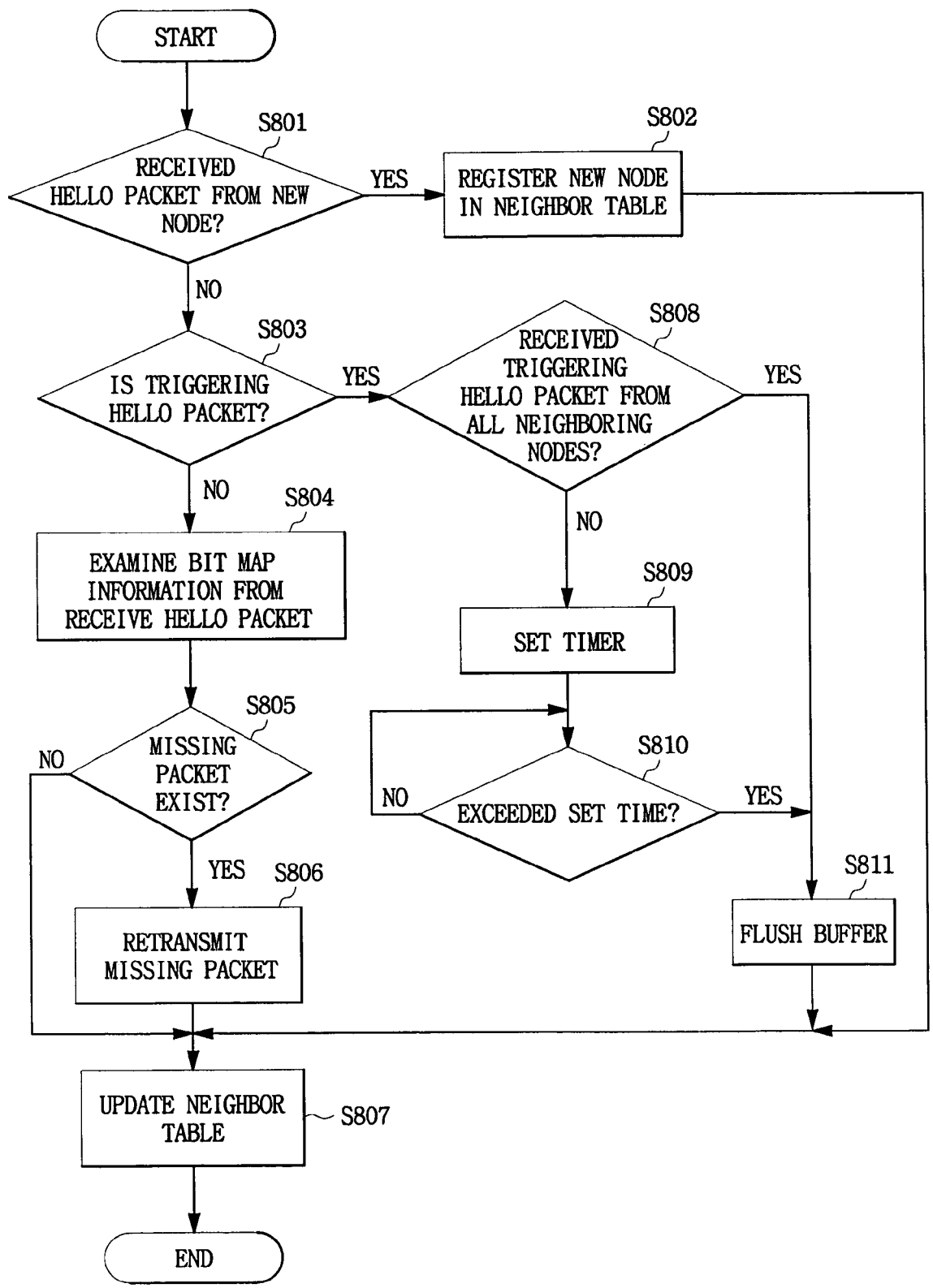
FIG. 10 is a flowchart of a process of receiving a hello packet generated according to the process in FIG. 9 and processing the received hello packet.

FIG. 10 is a flowchart of a process of receiving a hello packet generated according to the process in FIG. 9 and processing the received hello packet.

Referring to FIG. 10, any one of the relayer and sender nodes determines whether a hello packet has been received from a new node which does not exist in its neighbor table (S801).

If the hello packet is received from the new node, the new node is registered in the neighbor table (S802).

However, if the hello packet is received from any node existing in the neighbor table, the pertinent node determines if the received hello packet is a triggering hello packet (S803). The triggering hello packet can be classified into two types of hello packets: The first hello packet is periodically transmitted by setting a timer or setting received Broadcast Count Numbers. The second hello packet is used for the purpose of flushing all broadcast data stored in a transmission buffer of the sender node when the transmission buffer is full of received broadcast packets.

That is, in step S803, broadcasting is performed up to a point that the buffer of the pertinent node executing this routine is full in order to determine if the received hello packet is one used by any neighboring node to flush the transmission buffer.

If the received packet is not the triggering hello packet that is used for flushing the buffer, the pertinent node examines bit map information of the received hello packet (S804).

Next, the pertinent node determines if any missing packet exists based upon examined bit map information of the received hello packet (S805). If the missing packet exists, the pertinent node transmits a broadcast packet corresponding to the missing packet toward the receiver node or the relayer node (S806), and updates its neighbor table (S807). That is, bit map information and Broadcast Count (BC) information are updated in the neighbor table of the pertinent node.

However, if the missing packet does not exist as a result of bit map examination in the step S805, the pertinent node updates only the neighbor table.

On the other hand, if the received hello packet is the triggering hello packet in S803, the pertinent node determines if the triggering hello packet has been received from all of the neighboring nodes for the purpose of flushing the buffer (S808).

If the triggering hello packet is received from all of the neighboring nodes, the buffer is flushed (S811). On the contrary, if the triggering hello packet is not received from all of the neighboring nodes, the timer is set (S809). That is, if there is any node which did not transmit a triggering hello packet, a reference time is set with the timer since the pertinent node cannot wait for the triggering hello packet from the associated node for an indefinite time without flushing the buffer.

When the timer is set, the pertinent node examines whether a counted time exceeds the set reference time. If the counted time exceeds the set reference time, the buffer is flushed even if the triggering hello packet is not received.

Next, a process of receiving a broadcast data will be described in a stepwise fashion with reference to FIG. 11.

Figure 11:
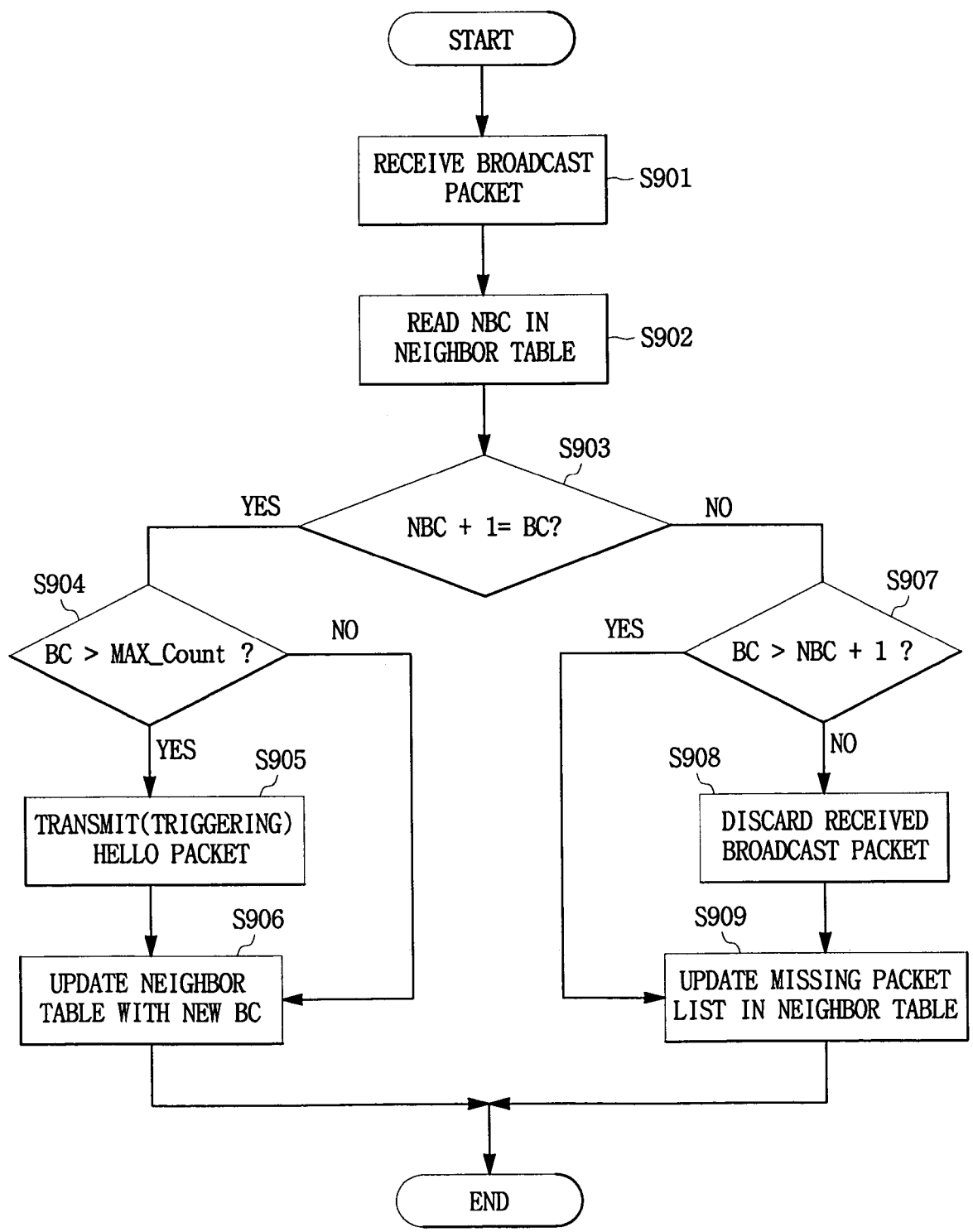
FIG. 11 is a flowchart of a process of receiving a broadcast data in a relayer node or a receiver node in accordance with an embodiment of the present invention.

FIG. 11 is a flowchart of a process of receiving a broadcast data in a relayer node or a receiver node in accordance with an embodiment of the present invention.

When any one of relayer and receiver nodes receives a broadcast packet (S901), the pertinent node reads NBC from its neighbor table (S902). NBC indicates the Latest Neighbor's Broadcast Count Number or the value of the latest received broadcast packet.

Then, the pertinent node determines if NBC+1 of the newly received broadcast packet is same as BC in the neighbor table (S903). That is, Broadcast Count Number (BC) of the latest broadcast packet is compared with NBC+1 which is received after BC. Accordingly, it is determined if the broadcast packet transmitted from a sender node or a relayer node has been completely received, for example, by the receiver node.

If NBC+1 number is same as BC, that is, the receiver node receives the broadcast packet transmitted, for example, from the sender or relayer node completely without loss, more particularly, the receiver node received a 30th broadcast packet NBC from the sender node and the sender node currently transmits a 31st broadcast packet BC at NBC+1=BC without existence of no missing packet, the receiver node determines if BC is larger than MAX_Count (S904), MAX_Count being the buffer size of the sender node. That is, it is determined if the Broadcast Count Number exceeds the buffer size of the sender node.

If the currently transmitted Broadcast Count Number (BC) exceeds the buffer size of the sender node, the receiver node transmits a triggering hello packet to the sender node (S905). After transmission of the hello packet for flushing the buffer, the receiver node updates the neighbor table according to the new Broadcast Count Number (S906).

However, if the currently transmitted Broadcast Count Number (BC) does not exceed the buffer size of the sender node, then step S906 is directly executed.

Also, if NBC+1 is not same as BC in step S903, it is determined if BC is larger than BNC+1 (S907).

If BC is larger than NBC+1, that is, if the Broadcast Count Number of packets transmitted by the sender node up to the present is larger than the Broadcast Count Number of packets received by the receiver node up to the present, in which the sender node transmitted all 31 packets BC and the receiver node received 29 packets with the loss of the 30th packet, the receiver node updates a missing packet list in its neighbor table (S909), in which the missing packet will be retransmitted via a hello packet.

However, if BC is not larger than NBC+1 in step S907, that is, if the receiver node receives a 25th packet even though the receiver packet is supposed to receive a 30th packet, in which the receiver node receives a packet at the retransmission request of any other nodes even though all of the packets are received, the receiver node discards the received packet (S908).

Figure 12:
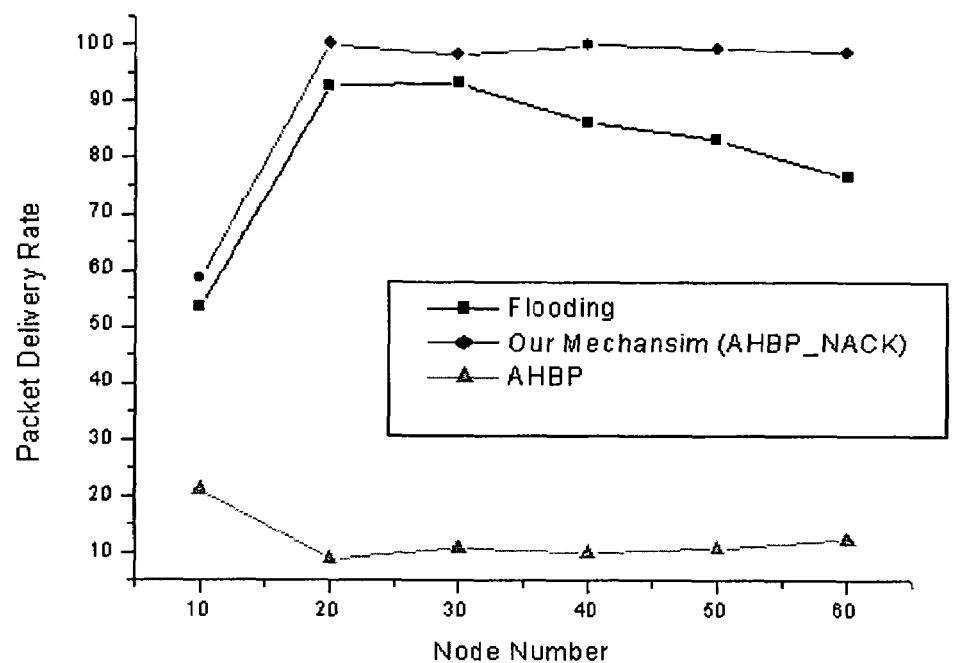
FIG. 12 is a graph comparing measured packet transmission rates according to the prior art and an embodiment of the present invention.
Figure 13:
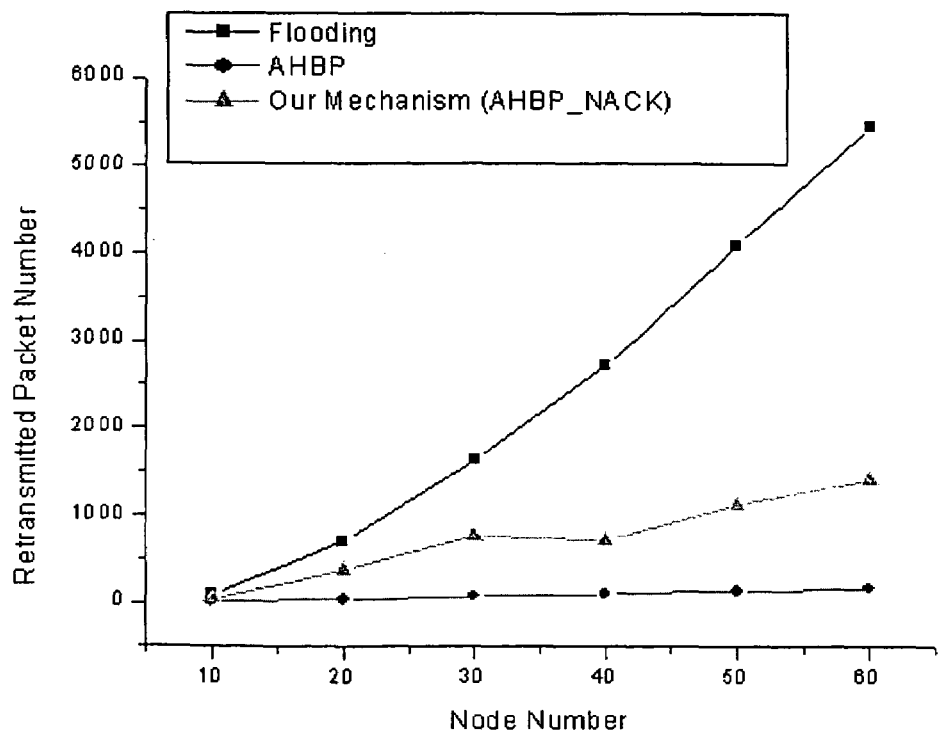
FIG. 13 is a graph comparing measured packet transmission numbers according to the prior art and an embodiment of the present invention.

Network simulation was executed with respect to the method of processing broadcast data in a mobile Ad-hoc network according to an embodiment of the present invention and methods of processing a broadcast packet via flooding and relayer according to the prior art, and their results for comparing packet transmission rates and transmitted packet numbers are indicated in FIGS. 12 and 13.

FIG. 12 is a graph comparing measured packet transmission rates according to the prior art and an embodiment of the present invention, and FIG. 13 is a graph comparing measured packet transmission numbers according to the prior art and an embodiment of the present invention.

As shown in FIG. 12, the packet transmission rate of an embodiment of the present invention has performance similar to or better than the reliable effect of redundant packet transmission which is an advantage of conventional flooding. Although the conventional flooding can transmit a number of redundant packets, it does not retransmit any missing packet in a packet collision and thus fails to increase reliability.

Further, as shown in FIG. 13, the packet transmission number increases exponentially in proportion to the number of transmission nodes according to the conventional flooding. On the contrary, the conventional relayer technique maintains a uniform value of 100 or less regardless of an increased transmission node number.

The broadcast data processing method of an embodiment of the present invention transmits more packets than the relayer technique to ensure reliability but does not cause an abrupt increase in the packet transmission number with respect to an increased node number unlike the flooding technique.

Accordingly, the method of processing broadcast data in an Ad-hoc network in accordance with an embodiment of the present invention has a trade-off relationship between bandwidth and reliability in transmission of broadcast data in the mobile Ad-hoc network so as to potentially increase bandwidth as well as raise reliability.

What is claimed is:

1. A method comprising:
   receiving broadcast packets transmitted from a transmitting node and determining if all of the broadcast packets have been received using a Latest Neighbor's Broadcast Count Number (NBC) stored in a neighbor table within a buffer of a pertinent node and a Broadcast Count Number (BC) contained in the broadcast packets received from the transmitting node;
   comparing the Broadcast Count Number (BC) of the received broadcast packet with a buffer size of the pertinent node if all of the broadcast packets transmitted from the transmitting node have been received; and
   generating a hello packet for flushing a buffer of the transmitting node and transmitting the hello packet to the transmitting node, flushing the buffer of the pertinent node, and updating the neighbor table of the flushed buffer of the pertinent node in accordance with the broadcast packet if the Broadcast Count Number (BC) of the received broadcast packet exceeds the buffer size of the pertinent node.

2. The method according to in claim 1, wherein the neighbor table comprises ID information of a broadcast packet transmitting node, Latest Neighbor's Broadcast Count Number (NBC) information, buffer size information of a buffer storing the received broadcast packets and bit map information regarding a list of packets from among the received broadcast packets that have not been received due to a packet error or missing packet.

3. The method according to claim 1, wherein the transmitting node comprises a relay node to relay the broadcast packets transmitted via a sender node which generates and transmits the broadcast packets toward a receiving node.

4. The method according to claim 1, wherein each broadcast packet comprises an IP header field, a relayer node list information field including list information of neighboring relayer nodes, a broadcast count information field of broadcast packets transmitted from an associated node and a broadcast data field.

5. The method according to claim 1, further comprising updating received broadcast packet information in the neighbor table if the Broadcast Count Number (BC) of the received broadcast packet does not exceed the buffer size of the pertinent node.

6. The method according to claim 1, further comprising periodically generating a hello packet containing broadcast packet receipt confirmation information and transmitting the hello packet to the transmitting node according to a predetermined time period or a predetermined packet number upon receipt of the broadcast packet from the transmitting node.

7. The method according to claim 1, wherein the hello packet comprises a packet type information field, a reply information (NACK, ACK) field regarding receipt of the broadcast packet, a flag information field including a reserved field, an ID information field of a neighboring transmitting node, a Broadcast Count Number (BC) information field, a bit map information field (NACK MAP) of missing packets identified by a failure to receive a broadcast packet receipt, a neighbor information field containing ID information of the sender node and neighboring relayer nodes and NACK information as to reply information in response to the failure to receive the broadcast packet receipt, a broadcast retransmission information field containing ID information of a corresponding node from which a broadcast packet has not been received, and a node and ID information or source (SRC) address of the corresponding node.

8. The method according to claim 1, further comprising:
determining if the Broadcast Count Number BC contained in the received broadcast packets is larger than a Broadcast Count Number (NBC+1) following the Latest Neighbor's Broadcast Count Number (NBC) if all of the broadcast packet have not been received;
updating a missing packet list in the neighbor table of the receiver node and transmitting a hello packet for retransmission of a missing packet if the Broadcast Count Number transmitted up to the present from the transmitting node is larger than the Broadcast Count Number received up to the present; and
determining if the receiver node has received all of the packets and a corresponding broadcast packet has been received at the request of another node for retransmission of a missing packet and discarding the received broadcast packet if the Broadcast Count Number transmitted up to the present from the transmitting node is not larger than the Broadcast Count Number received up to the present.

9. The method according to claim 6, wherein generating and transmitting a hello packet to the transmitting node comprises:
sequentially retrieving broadcast data bit map information regarding respective nodes which transmitted the broadcast packets stored in the neighbor table to determine if there is a missing packet; and
generating a hello packet for requesting the missing packet using a bit map in the neighbor table and transmitting the hello packet to a corresponding node which transmitted the missing packet if it has been determined that there is a missing packet.

10. The method according to claim 9, wherein, upon receiving the hello packet, the transmitting node:
determines if the hello packet has been received from a new node which is not listed in a neighbor table within a buffer of the transmitting node;
determines if the received hello packet is a triggering hello packet for flushing a full buffer if the hello packet has been received from a node listed in the neighbor table of the transmitting node;
examines bit map information in the received hello packet to determine if there is a missing packet if the received hello packet is not the triggering hello packet but is a hello packet for periodically informing receipt of a broadcast packet; and
transmits a broadcast packet corresponding to the missing packet to the node which transmitted the hello packet and updating the neighbor table of the transmitting node if there is a missing packet.

11. The method according to claim 10, wherein, if the received hello packet is determined to be a triggering hello packet, the transmitting node:
determines if triggering hello packets have been received from all of the neighboring nodes for the purpose of buffer flushing;
flushes the buffer if the triggering hello packets have been received from all of the neighboring nodes and sets a timer to count a set time if the triggering hello packets have not been received from all of the neighboring nodes; and
compares the counted time with the set time and flushes the buffer even though the triggering hello packets have not been received from all of the neighboring nodes if the counted time exceeds the set time.

12. A method comprising:
providing at least one sender node and a relayer node to relay broadcast packets from the sender node to a receiver node;
the receiver node determining if all of the broadcast packets transmitted from the sender or relayer node have been received based upon a Latest Neighbor's Broadcast Count Number (NBC) stored in a neighbor table within a buffer of the receiver node and a Broadcast Count Number (BC) contained in the broadcast packets received from the sender or relayer node upon receiving the broadcast packets from the sender or relayer node;
the receiver node comparing the received broadcast packets with the buffer size of the Broadcast Count Number (BC) if all of the broadcast packets from the sender or relayer node have been received; and
generating a hello packet for flushing a buffer in the sender or relayer node and transmitting the hello packet to any of the sender and relayer nodes which transmitted the broadcast packets, flushing the buffer of the receiver node, and updating the neighbor table of the flushed neighbor table of the receiver node using the received broadcast packets if the Broadcast Count Number (BC) of the received broadcast packets exceeds the buffer size of the receiver node.

13. The method according to claim 12, wherein the neighbor table within the buffer of the receiver node comprises ID information of the relayer node which relayed the broadcast packets, latest NBC information received from the node which transmitted the broadcast packets, buffer size information of the buffer storing the received broadcast packets and bit map information regarding a list of packets from among the received broadcast packets which have not been received due to a packet error or missing packet.

14. The method according to claim 12, wherein each of the broadcast packets comprises an IP header field, a relayer node list information field containing list information of neighboring relayer nodes of the receiver node, a broadcast count information field for the broadcast packets transmitted from a corresponding node, and a broadcast data field.

15. The method according to claim 12, further comprising the receiver node periodically generating and transmitting a hello packet containing broadcast packet receipt confirmation information to the relayer node or to the sender node via the relayer node according to a predetermined time interval or a predetermined packet number upon receiving the broadcast packet from the relayer node.

16. The method according to claim 15, wherein the hello packet transmitted to the relayer node or to the sender node via the relayer node from the receiver node comprises: a packet type information field, a reply information (NACK, ACK) field regarding receipt of the broadcast packet, a flag information field including a reserved field, an ID information field of a neighboring transmitting node, a broadcast count (BC) information field, a bit map information field (NACK MAP) of missing packets identified by a failure to receive a broadcast packet receipt, a neighbor information field containing ID information of the sender node and neighboring relayer nodes and NACK information as reply information in response to the failure to receive the broadcast packet receipt and a broadcast retransmission information field containing ID information of a corresponding one of the relayer and sender nodes from which a broadcast packet has not been received and a node and ID information or source (SRC) address of the corresponding node.

17. The method according to claim 12, further comprising:
determining if the Broadcast Count Number (BC) contained in the received broadcast packet is larger than a Broadcast Count Number NBC+1 following the Latest Neighbor's Broadcast Count Number (NBC) if it has been determined that all of the transmitted broadcast packets have not been received from the relayer node;
updating a missing packet list in the neighbor table of the receiver node and transmitting a hello packet for retransmission of a missing packet if the Broadcast Count Number transmitted up to the present from the relayer node is larger than the Broadcast Count Number received up to the present; and
determining if the receiver node has received all of the packets and a corresponding broadcast packet has been received at the request of another node for retransmission of a missing packet and discarding the received broadcast packet if the Broadcast Count Number transmitted up to the present from the relayer node is not larger than the Broadcast Count Number received up to the present.

18. The method according to claim 12, wherein generating and transmitting a hello packet to the relayer node or to the sender node via the relayer node comprises:
sequentially retrieving broadcast data bit map information regarding the sender and relayer nodes which have transmitted broadcast packets stored in the neighbor table within the buffer of the receiver node to determine if there is a missing packet; and
generating a hello packet for requesting the missing packet using bit map information in the neighbor table and transmitting the hello packet to the relayer node or to the sender node via the relayer node that transmitted the missing broadcast packet if it has been determined that there is a missing packet.

19. The method according to claim 18, wherein upon receiving the hello packet, the relayer or sender node:
determines if the hello packet has been received from a new receiver node which is not listed in a neighbor table within a buffer of the relayer or sender node;
determines if the received hello packet is a triggering hello packet for flushing a full buffer if the hello packet has been received from a node listed in the neighbor table of the relayer or sender node;
examines bit map information in the received hello packet to determine if there is a missing packet if the received hello packet is not the triggering hello packet but is a hello packet for periodically informing receipt of broadcast packets; and
transmits a broadcast packet corresponding to the missing packet to the receiver node which transmitted the hello packet and updates the neighbor table of the relayer or sender node if there is a missing packet.

20. The method according to claim 19, wherein, if the received hello packet is determined to be a triggering hello packet, the relayer or sender node:
determines if the triggering hello packets have been received from all of the neighboring nodes for flushing the buffer;
flushes the buffer if the triggering hello packets have been received from all of the neighboring nodes, and sets a timer to count a set time if the triggering hello packets have not been received from all of the neighboring nodes; and
compares the counted time with the set time and flushes the buffer even though the triggering hello packets have not been received from all of the neighboring nodes if the counted time exceeds the set time.

21. A method comprising:
providing at least one sender node and a relayer node to relay broadcast packets from the sender node to a receiver node;
transmitting a hello packet processed by the relayer or sender node upon receipt of the broadcast packets:
determining if the hello packet has been received from a new receiver node which is not listed in a neighbor table within a buffer of the relayer or sender node;
determining if the received hello packet is a triggering hello packet for flushing a full buffer if the hello packet has been received from a node listed in the neighbor table of the relayer or sender node;
examining bit map information in the received hello packet to determine if there is a missing packet if the received hello packet is not the triggering hello packet but is a hello packet for periodically acknowledging receipt of the broadcast packets; and
transmitting a broadcast packet corresponding to the missing packet to the receiver node which transmitted the hello packet and updating the neighbor table of the relayer or sender node if there is a missing packet.

22. The method according to claim 21, wherein if the received hello packet is determined to be a triggering hello packet, the relayer or sender node:
determines if the triggering hello packets have been received from all of neighboring nodes for flushing the buffer;
flushes the buffer if the triggering hello packets have been received from all of the neighboring nodes and sets a timer to count a set time if the triggering hello packets have not been received from all of the neighboring nodes; and
compares the counted time with the set time and flushes the buffer even though the triggering hello packets have not been received from all of the neighboring nodes if the counted time exceeds the set time.

23. The method according to claim 21, wherein the hello packet transmitted from the receiver node comprises: a packet type information field, a reply information (NACK, ACK) field regarding receipt of the broadcast packet, a flag information field including a reserved field, an ID information field of a neighboring transmitting node, a broadcast count (BC) information field, a bit map information field (NACK MAP) of missing packets in response to a failure to receive a broadcast packet receipt, a neighbor information field containing ID information of the sender node and neighboring relayer nodes and NACK information as reply information in response to the failure to receive the broadcast packet receipt and a broadcast retransmission information field containing ID information of a corresponding one of the relayer and sender nodes from which a broadcast packet has not been received and a node and ID information or source (SRC) address of the corresponding node.

* * * * *